US012737216B1

(12) United States Patent
Raphael et al.

(10) Patent No.: US 12,737,216 B1
(45) Date of Patent: Sep. 15, 2026

(54) PATH CACHING AND ARTIFICIAL INTELLIGENCE FALLBACK FOR ARTIFICIAL INTELLIGENCE AGENT FLOWS

(71) Applicant: Intuit Inc., Mountain View, CA (US)

(72) Inventors: Brandon Raphael, Oceanside, CA (US); Dylan Warnock, San Francisco, CA (US); Sujana Basnet, Santa Clara, CA (US); Amir Eftekhari, San Diego, CA (US); Zhenghe Wang, Mountain View, CA (US); Bema Kwadwo Bonsu, San Diego, CA (US); Cody Waylon Driscoll, Temecula, CA (US); Ben Koonse, Oceanside, CA (US); Thomas Edmund Payne, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/376,514

(22) Filed: Oct. 31, 2025

(51) Int. Cl.

| | |
|---|---|
| ***G06F 9/48*** | (2006.01) |
| ***G06F 8/35*** | (2018.01) |
| ***G06F 9/451*** | (2018.01) |
| ***G06F 11/07*** | (2006.01) |
| ***G06N 3/092*** | (2023.01) |
| ***G06Q 10/0631*** | (2023.01) |

(52) U.S. Cl.
CPC ................ *G06F 9/485* (2013.01); *G06F 8/35* (2013.01); *G06F 9/453* (2018.02); *G06F 11/0721* (2013.01); *G06F 11/0769* (2013.01); *G06Q 10/06316* (2013.01); *G06N 3/092* (2023.01)

(58) Field of Classification Search
None
See application file for complete search history.

(56) References Cited

U.S. PATENT DOCUMENTS

| | | | | |
|---|---|---|---|---|
| 12,340,238 | B1 * | 6/2025 | Stănescu | G06F 9/451 |
| 12,346,713 | B1 * | 7/2025 | Vlasceanu | G06F 16/3346 |
| 2019/0258983 | A1 * | 8/2019 | Thomaidou | G06Q 10/06398 |
| 2019/0324822 | A1 * | 10/2019 | Gottin | G06F 9/4401 |
| 2019/0347168 | A1 * | 11/2019 | Giannetti | G06F 11/1438 |
| 2020/0320372 | A1 * | 10/2020 | Nachum | G06N 3/045 |

(Continued)

OTHER PUBLICATIONS

UiPath, URL: https://www.uipath.com/ (accessed Oct. 31, 2025).

(Continued)

*Primary Examiner* — Abu Zar Ghaffari
(74) *Attorney, Agent, or Firm* — Dinsmore & Shohl LLP

(57) ABSTRACT

An example method includes sending, to a computer, a first observation request for a first observation related to a task; obtaining, from the computer, the first observation; sending, to an artificial intelligence (AI) computer use agent (CUA) model, the first observation and a first action request for a first action related to one or more steps related to execution of the task; obtaining, from the AI CUA model, the first action; sending, to the computer, a first instruction to execute the first action on the computer; determining that the task has been executed successfully based on the first action; storing, via a data storage device, a first path comprising the first action; obtaining a task request for the task; obtaining, from the data storage device, the first path; and sending, to the computer, a second instruction to execute the first path.

18 Claims, 8 Drawing Sheets

(56) References Cited

U.S. PATENT DOCUMENTS

| | | | | |
|---|---|---|---|---|
| 2024/0412135 | A1* | 12/2024 | Stavarache | G06Q 10/06316 |
| 2025/0045848 | A1* | 2/2025 | Focke | G06Q 10/103 |
| 2025/0209406 | A1* | 6/2025 | Sivakumar | G06N 3/096 |
| 2025/0299133 | A1* | 9/2025 | Sen | G06N 20/00 |
| 2025/0315683 | A1* | 10/2025 | Feehan | G06N 5/04 |
| 2025/0356140 | A1* | 11/2025 | Nichol | G06F 9/453 |
| 2026/0086705 | A1* | 3/2026 | Chen | G06F 3/0486 |
| 2026/0093791 | A1* | 4/2026 | Jeyashekar | G06F 21/31 |

OTHER PUBLICATIONS

Automation Anywhere, URL: https://www.automationanywhere.com/ (accessed Oct. 31, 2025).

OpenAI Operator, URL: https://en.wikipedia.org/wiki/OpenAI_Operator (accessed Oct. 31, 2025).

Project Mariner, URL: https://en.wikipedia.org/wiki/Project_Mariner (accessed Oct. 31, 2025).

Claude, URL: https://en.wikipedia.org/wiki/Claude_(language_model) (accessed Oct. 31, 2025).

Browserbase, URL: https://docs.browserbase.com/introduction/what-is-browserbase (accessed Oct. 31, 2025).

* cited by examiner

PATH CACHING AND ARTIFICIAL INTELLIGENCE FALLBACK FOR ARTIFICIAL INTELLIGENCE AGENT FLOWS

BACKGROUND

Field

Aspects of the present disclosure relate to automated interaction with a user interface by an artificial intelligence computer use agent.

Description of Related Art

A user interface (UI), such as a graphical user interface (GUI), provides the means for a user to interact with a remote computer. For example, a web browser provides a UI for interacting with a website that is hosted on a remote computer. Conventional tools exist, where such tools allow a certain portion of the interaction with the website to be automated. For example, such a tool may record a series of manual interactions (e.g., click of a UI element, typing, etc.) by a user on a website, and replay the series of interactions to automate the series of manual interactions such that the user can replay the recorded interactions to perform a task on the website, instead of performing the series of manual interactions each iteration of performance of the task. An example of such task may be opening a website of a financial institution on a website and logging into a user account on the website.

Although there have been technological advancements over the years related to how the interaction with a UI may be automated, challenges still exist. For example, as websites continue to evolve, such as to update a website layout, add new functionalities, etc., the complexity in how a certain task is performed on a website becomes greater, too. Consequently, there exists a need for further improvements in automated interaction with a UI.

SUMMARY

Certain aspects provide a method performed by an artificial intelligence (AI) computer use agent (CUA). The method includes sending, to a computer, a first observation request for a first observation related to a task; obtaining, from the computer, the first observation; sending, to an AI CUA model, the first observation and a first action request for a first action related to one or more steps related to execution of the task; obtaining, from the AI CUA model, the first action; sending, to the computer, a first instruction to execute the first action on the computer; determining that the task has been executed successfully based on the first action; storing, via a data storage device, a first path related to the task based on determining that the task has been executed successfully based on the first action, the first path comprising the first action; obtaining a task request for the task; obtaining, from the data storage device, the first path; and sending, to the computer, a second instruction to execute the first path on the computer.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
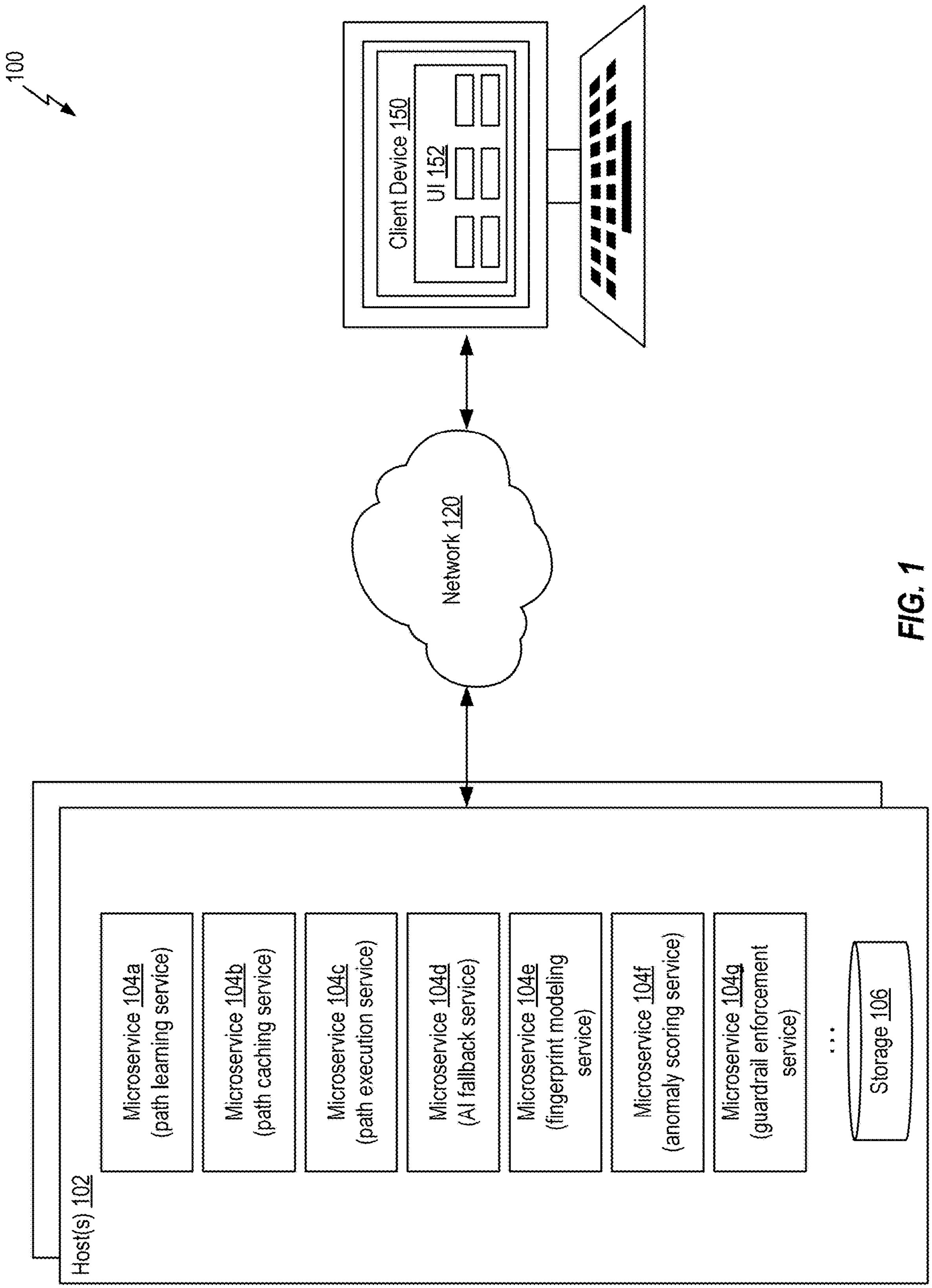
FIG. 1 is a schematic system diagram illustrating an example processing system supporting microservices interconnected via a network.

Aspects of the present disclosure provide apparatuses, methods, processing systems, and computer-readable mediums for automated interaction with a user interface (UI), such as by an artificial intelligence (AI) computer use agent (CUA).

The technical field of automated interaction with user interfaces (UIs) by artificial intelligence (AI) agents has seen significant interest as machine learning (ML) models have advanced in capabilities. Conventional systems, such as robotic process automation (RPA) tools, rely on pre-programmed scripts to automate interactions with web-based applications. These systems are often brittle and prone to failure when faced with dynamic changes in UI layouts, element functionalities, or unforeseen scenarios. For example, when a website undergoes a redesign or updates its structure, traditional RPA systems fail to adapt, requiring manual intervention to rewrite or update scripts. This lack of adaptability results in high maintenance costs, increased latency, wasted compute resources, and limited scalability, which hinders the broader adoption of such systems for complex or dynamic tasks. And while leveraging state of the art ML models can address some of these technical issues, the reliance on computationally expensive ML models for each iteration of a task exacerbates operational costs and latency, making these systems inefficient for large-scale or repetitive workflows.

Aspects described herein address these limitations by introducing a hybrid, tiered reasoning framework that combines deterministic path caching with an AI fallback mechanism. The described concept leverages path caching to store successful action sequences as deterministic paths in a path database, indexed by their starting conditions. When a task is initiated, an AI computer use agent (CUA) first attempts to execute the task using a matching pre-recorded path from the cache, which is computationally efficient, low-cost, and low-latency. This eliminates the need to repeatedly call resource-intensive AI models for tasks that have been successfully completed in the past. If the task deviates from the cached path due to changes in the UI or other unforeseen circumstances, the system dynamically falls back to an AI model for analysis and discovery. The AI model interprets the current state of the UI, generates a new plan, and determines the next action to complete the task. The results from the fallback process are then used to create new cached paths, enabling the system to continuously learn and improve over time-all while dramatically reducing overall computing resources usage over time.

Additionally, aspects described herein incorporate a behavioral fingerprinting mechanism to ensure the reliability and safety of the AI CUA. During a learning phase, the system observes multiple successful task executions to build a statistical model of typical behavior, which includes metrics such as timing per step, types of UI elements interacted with, and navigation sequences. During live operation, the system monitors the AI CUA in real-time, comparing the AI CUA's actions against the established fingerprint. If the AI CUA deviates significantly from the expected behavior, the system calculates an anomaly score and enforces guardrails to prevent unwanted or unsafe actions. These guardrails may include pausing the agent, requiring human intervention, or terminating the session.

By integrating path caching, AI fallback, and behavioral fingerprinting, aspects described herein provide a robust, scalable, and adaptive solution for automated interaction with user interfaces of various types of computing systems. This approach reduces latency and computational costs, enhances reliability, and ensures safe operation, representing a transformative advancement in the field of AI-driven automation. The hybrid methodology addresses the limitations of conventional systems while enabling the development of self-healing paths and intelligent workflows that adapt to dynamic environments, opening opportunities for web-based automation.

Example System for Automated Interaction with a User Interface

FIG. 1 depicts an example system 100 supporting a plurality of microservices 104 (e.g., software-defined services, which in some cases, may be cloud-native). As shown in FIG. 1, system 100 includes one or more client devices 150 (collectively referred to herein as "client devices 150") and one or more hosts 102 (collectively referred to herein as "hosts 102"). A network 120 may provide connectivity between client device 150 and host 102. Network 120 may include, for example, a direct link, a local area network (LAN), a wide area network (WAN) (such as the Internet), another type of network, or a combination of one or more of these networks.

Host 102 may be geographically co-located servers on the same rack or on different racks in any arbitrary location in a data center. Host 102 may be implemented on a server-grade hardware platform. Host 102 or the hardware platform may include components of a computing device, such as one or more processors (e.g., central processing units (CPUs)), one or more memories (e.g., random access memory (RAM)), one or more network interfaces (e.g., physical network interfaces (PNICs)), storage 106, and/or other components, as described elsewhere herein. Storage 106 and other example components of an apparatus that may implement host 102 are described elsewhere herein.

Host 102 in system 100 may host a set of one or more microservices 104 (collectively referred to herein as "microservice(s) 104"). The microservice(s) 104 may be deployed using virtual machines (VMs) and/or container(s) implemented on host 102). For example, host 102 may implement a hypervisor (not shown) that abstracts processor, memory, storage, and networking resources of host 102's hardware platform). Generally, a microservice 104 is a loosely coupled and independently deployable service or software that, alone or in combination with one or more other microservices 104, may make up an application. Microservice(s) 104 may enable segmented, granular level functionalities within a larger system infrastructure. A reference to a single microservice 104 can encompass multiple microservices 104, unless context indicates otherwise.

Client device 150 may include a user interface (UI) 152. UI 152 may be usable to communicate with microservice 104 via network 120. For example, communication between client devices 150 and a microservice 104 may be facilitated by one or more application programming interfaces (APIs). An API is a set of rules and protocols that allows different software applications to communicate and share data with each other. Non-exhaustive examples of client devices 150 may include a smartphone, a personal computer, a tablet, or a laptop computer. In some examples, microservice 104 may interact with another microservice, an application, a host, or the like, via network 120.

As shown in FIG. 1, in certain aspects, microservices 104 implement a path learning service 104*a*, a path caching service 104*b*, a path execution service 104*c*, an AI fallback service 104*d*, a fingerprint modeling service 104*e*, an anomaly scoring service 104*f*, and a guardrail enforcement service 104*g*, each of which is a network 120 accessible service that enables automated interaction with a UI by an AI CUA. One or more of these services may be used to implement various features described herein with respect to FIGS. 2-8. In some aspects, one or more of these services and/or another microservice 104 may implement path caching and AI fallback for AI agent flows associated with the automated interaction with a UI. For example, a cached path may be used to perform the automated interaction with the UI, and the AI fallback may be performed, where an AI CUA may interpret the UI and determine an updated path for performing the automated interaction with the UI when an issue is detected in performing the automated interaction with the UI (e.g., based on changes to a UI layout, certain UI element functionalities, etc.). A microservice 104, or a host 102 that implements a microservice 104, may be referred to as an apparatus.

Though FIG. 1 depicts host 102, storage 106, and client device 150 as single devices for ease of illustration, host 102, storage 106, and/or client device 150 may be embodied in a variety of forms. Further, though FIG. 1 depicts only one host 102 and one client device 150, other examples may include a different number of hosts 102 and/or client devices 150. Client devices 150 may use any combination of microservices 104 on any host 102 where microservices 104 are deployed.

Aspects Related to Automated Interaction with a User Interface

Figure 2:
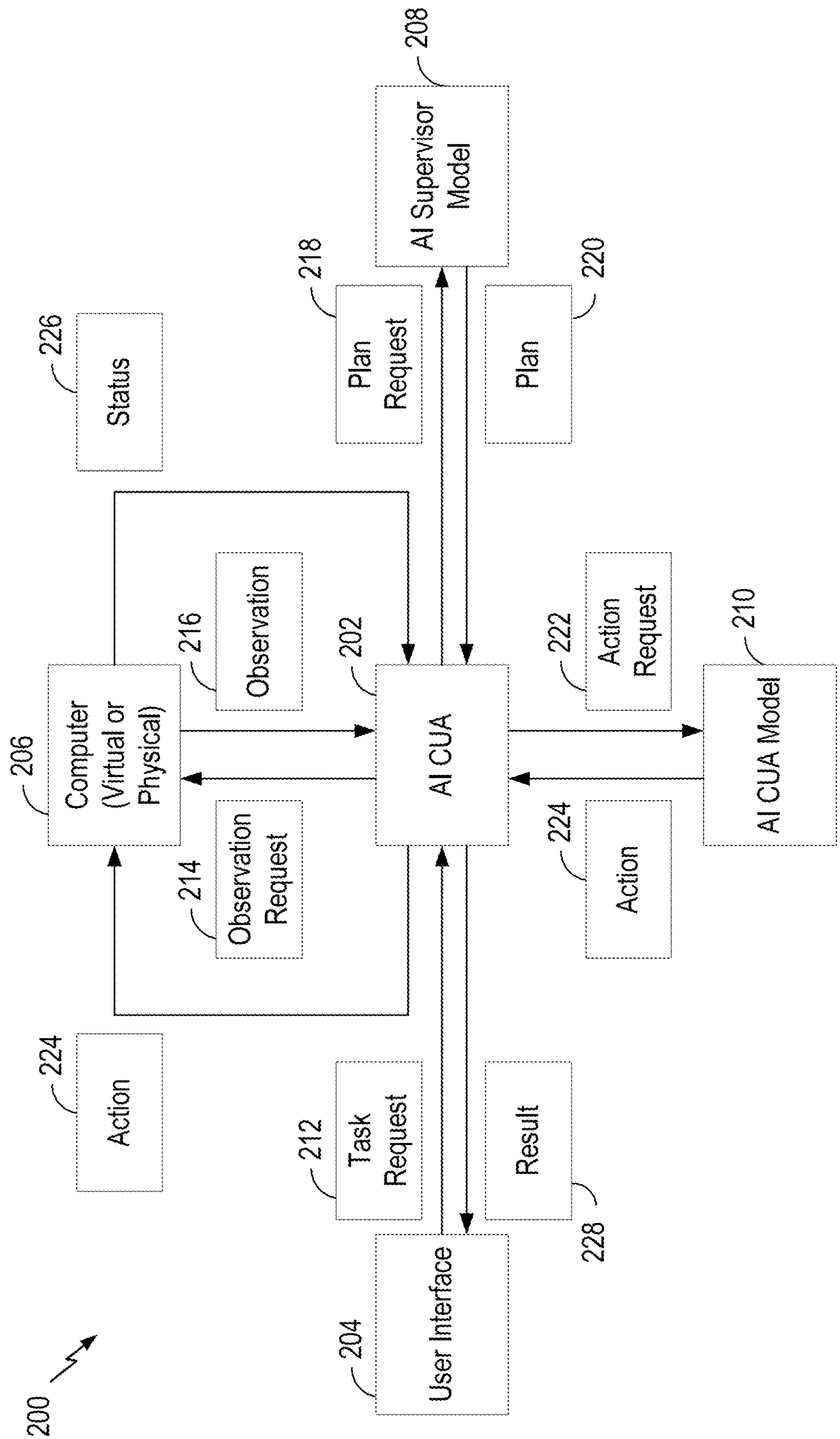
FIG. 2 depicts an example artificial intelligence (AI) computer use agent (CUA) system.

FIG. 2 depicts an example AI CUA system 200. The system 200 includes AI CUA 202, UI 204, computer 206, AI supervisor model 208, and AI CUA model 210 used to implement certain features of AI CUA 202.

The term "AI computer use agent" (also referred to as "AI CUA"), as used herein, refers to an artificial intelligence agent capable of controlling a computing system, such as a physical computer (including server computers) or a virtual computer. The AI CUA is configured to interpret its environment, plan workflows to achieve specified goals or tasks, and execute those workflows by interacting with various tools, models, databases, and application programming interfaces (APIs).

Generally speaking, the AI CUA operates by receiving a task or goal (e.g., defined as a specific objective, command, or set of instructions provided by a user or another system) and then performing a sequence of discrete actions (such as mouse clicks, key presses, text input, or window manipulations) on the computing system to accomplish the task. The agent leverages an AI computer use model (e.g., AI CUA model described herein) to understand and interpret the state of the computing system, such as by processing visual observations like screenshots or structural summaries of the user interface.

In some cases, the AI CUA may be part of a larger framework or platform that provides the agent as a service, encompassing virtual computers, AI models, and associated backend systems required to operate the agent. The AI CUA may also include additional capabilities, such as specialized functions or tools, which extend its abilities beyond the native reasoning of its model, allowing it to perform specific actions or access external data sources.

Accordingly, the AI CUA is generally an artificial intelligence system that autonomously controls a computer by interpreting its environment, planning and executing actions to achieve user-defined goals, and interacting with various software and hardware components as needed to complete tasks.

The term "AI CUA model," as used herein, refers to the artificial intelligence model leveraged by the AI CUA to understand and interpret the state of a computer, particularly by processing visual observations. The AI CUA model is typically responsible for receiving input data related to the current state of the UI, such as images, hashes, or encoded representations, and, in conjunction with a plan or instructions, generating predictions of discrete actions to be performed on the computer.

In certain embodiments, the AI CUA model may be implemented as a vision model, which analyzes visual data from the UI to determine the appropriate action (for example, identifying a button to click or a field to enter text). The AI CUA model may also be capable of integrating additional capabilities, such as specialized functions or tool calls, which extend its abilities beyond native reasoning, allowing it to interact with external data sources or perform specific operations.

The AI CUA model is distinct from the AI supervisor model, which is responsible for generating the overall plan or sequence of steps for task completion. Instead, the AI CUA model focuses on interpreting observations and producing the specific actions required to execute the plan on the computer.

Accordingly, the AI CUA model is generally an artificial intelligence model utilized by the AI CUA to process observations of a computer's user interface and generate discrete actions for execution, thereby enabling the agent to autonomously interact with and control the computer in pursuit of user-defined tasks.

The term "AI supervisor model," as used herein, refers to an artificial intelligence model that operates as a supervisory component within the AI CUA framework. The AI supervisor model is generally configured for receiving information related to a task, such as a task request and, in some cases, an observation of the user interface, and generating a plan for execution of the task. The plan produced by the AI supervisor model typically comprises one or more steps necessary to achieve the specified goal or task. In certain aspects, the AI supervisor model may be provided as part of a platform that may be configured for deploying AI agents for various applications.

The AI supervisor model may be implemented as a machine learning model, such as a language model (LM), which is capable of interpreting task instructions and predicting a sequence of actions or workflow steps. In certain embodiments, the AI supervisor model may also include a vision model, which processes visual data from the UI (such as screenshots or structural summaries) to inform its planning.

The AI supervisor model thus functions as an orchestrator (e.g., for each cycle of observation, plan, and action), determining the overall strategy for task completion and delegating specific actions to other models or components, such as the AI CUA model. For example, the AI supervisor model may be a general-purpose AI model for reasoning, and guide the performance of the task. It is distinct from the AI CUA model, which is typically responsible for interpreting observations and generating discrete actions to be performed on the computer. The AI supervisor model may not be accessed directly by a user, but may be accessed through an AI CUA framework (e.g., its APIs or software development kits (SDKs)).

Accordingly, the AI supervisor model is generally an artificial intelligence model that receives task-related information, analyzes the current state of the UI or environment, and generates a plan comprising one or more steps for execution of the task, thereby guiding the operation of the AI CUA within the described framework.

Now with reference to the specific example of FIG. 2, as depicted, AI CUA 202 obtains a task request 212 for a task. In certain aspects, the task may be related to an interaction with a UI, such as a UI from an output device of computer 206 or of a web browser running on computer 206. In certain aspects, computer 206 may be a physical computer or a virtual computer (e.g., a software-based emulated version of a physical computer, such as running on a remote computer).

AI CUA 202 obtains the task request 212 from UI 204, where UI 204 may be part of a user application through which a user may (or the application may) provide a request for the task. In some cases, such as described with respect to FIG. 4, UI 204 may be part of, or an interface for, a client application that is in data communication with AI CUA 202. For example, AI CUA 202 may perform a task as requested or instructed by the client application. To perform the task, AI CUA 202 may design one or more workflows, such as based on the task. For example, based on the task being an interaction with a UI of computer 206, AI CUA 202 may design workflow(s) to obtain observation 216 from computer 206, determine a plan related to the observation (e.g., plan 220), determine an action based on the plan (e.g., action 224), and cause the action to be executed on computer 206. In some cases, AI CUA 202 may design the workflow(s) by sending a request for the workflow(s) to an AI supervisor model, such as AI supervisor model 208 described herein. The AI supervisor model may provide a plan as a response. Thus, the plan as provided by the AI supervisor model, such as plan 220 described herein, may make up the workflow for performing a task. An example of such AI supervisor model for designing a workflow may include a multimodal model, such as with vision capability.

As depicted, AI CUA 202 sends, to computer 206, observation request 214. The term "observation request," as used herein, refers to a communication or instruction sent by an AI CUA to a computing system (e.g., physical or virtual) for the purpose of obtaining information about the current state of a UI or environment associated with the computing system. This request typically initiates the process of capturing a representation of the UI, such as a screenshot, a hash of the screenshot, or a structural summary of the UI, which encodes details about UI elements, their positions, and other relevant attributes.

An observation request may include specific parameters or initial details, such as a starting uniform resource locator (URL) to load on the UI, or an indication of an initial action to be performed prior to capturing the observation. The resulting observation, obtained in response to the observation request, serves as input for subsequent reasoning, planning, or action determination by the AI CUA or its associated models.

Accordingly, an observation request is generally a directive from the AI CUA to a computing system to capture and return a representation of the UI or environment, enabling the agent to interpret, plan, and execute tasks based on the current state of the system.

For example, observation request 214 may include a request to obtain an observation (e.g., observation 216) from computer 206, such as corresponding to a screenshot of the UI of computer 206 (e.g., of a website provided on a web browser). In some cases, observation request 214 includes an initial detail related to observation 216 (e.g., an indication of an initial action), such as a URL of a website to load on the UI of computer 206, to obtain observation 216, where observation 216 may be for the website that is loaded based on the URL.

AI CUA 202 obtains, from computer 206, observation 216 based on observation request 214.

The term "observation," as used herein, refers to a representation of the current state of a UI or environment associated with a computing system. An observation is typically obtained in response to an observation request sent by an AI CUA and serves as input for subsequent reasoning, planning, or action determination by the AI CUA or its associated models.

An observation may take various forms, including but not limited to a screenshot of the UI, a hash of the screenshot, or a structural summary of the UI. These representations encode information about UI elements, their positions, attributes, and other relevant details necessary for the AI CUA to interpret the environment and determine appropriate actions. The observation provides the AI CUA with the necessary context to understand the current state of the system and to plan and execute tasks accordingly.

Accordingly, an observation generally refers to any captured or encoded representation of the UI or environment of a computing system, obtained for the purpose of enabling the AI CUA to interpret, plan, and perform actions in pursuit of a specified task or goal.

Thus, observation 216 encodes or includes information related to one or more UI elements of the UI of computer 206.

AI CUA 202 sends, to AI supervisor model 208, plan request 218 for a plan (e.g., plan 220) related to performing a task.

The term "plan request," as used herein, refers to a communication or instruction sent by the AI CUA to an AI supervisor model for the purpose of obtaining a plan related to the execution of a specified task. The plan request typically includes information about the task to be performed and, in some cases, may also include an observation of the UI or environment associated with the computing system.

Accordingly, a plan request is generally a directive from the AI CUA to the AI supervisor model to produce a plan for accomplishing a given task, based on the current state of the UI or environment and the details of the task to be performed.

Thus, plan request 218 may include information related to the task as well as observation 216. For example, AI supervisor model 208 may be prompted to predict a plan for performing the task, where the plan may include one or more steps to perform the task.

AI CUA 202 obtains, from AI supervisor model 208, plan 220.

The term "plan," as used herein, refers to a structured sequence of one or more steps generated by an AI supervisor model (e.g., 208) in response to a plan request from an AI CUA (e.g., 202). The plan is related to the execution of a specified task or goal and serves as a guide for the AI CUA to accomplish that task.

A plan typically comprises discrete actions or workflow steps that are necessary to achieve the desired outcome. These steps may include instructions for interacting with specific UI elements, navigating through screens, entering data, or performing other operations on a computing system. The plan may be informed by both the details of the task and any observations of the current state of the UI or environment.

Accordingly, plan (e.g., 220) generally refers to the set of one or more steps or actions determined by the AI supervisor model that outline how the AI CUA should proceed to complete a given task, providing the operational strategy for task execution.

As an example, the task to be performed may be to obtain a document from a website, and the predicted plan (e.g., 220) may be or include logging into the website. Other examples of tasks may also be possible, such as data extraction, document download, document storage, data entry, document upload, web browsing, other interactions with a website, etc., consistent with the present disclosure. In some cases, where observation 216 may also be provided to AI supervisor model 208, plan 220 may include information related to a UI element for logging into the website using a user account (e.g., with respect to the example of the task being obtaining a document from a website). For example, plan 220 may include logging into the website via a "Login" button, link, or other UI element on the website.

AI CUA 202 sends, to AI CUA model 210, action request 222 for an action (e.g., action 224) based on plan 220.

The term "action request," as used herein, refers to a communication or instruction sent by an AI CUA (e.g., 202) to an AI CUA model (e.g., 210) for the purpose of obtaining a prediction of a specific action to be performed on a computer. The action request typically includes relevant input data, such as an observation of the current state of the UI and, in some cases, a plan or a set of workflow steps generated by an AI supervisor model (e.g., 208).

Upon receiving an action request, the AI CUA model analyzes the provided observation and plan and generates a discrete action. The resulting action is then executed by the AI CUA on the computer (e.g., 206).

Accordingly, an action request (e.g., 222) generally refers to a directive from the AI CUA to the AI CUA model to produce a specific action for execution, based on the current observation and any relevant plan or instructions, thereby enabling the agent to interact with and control the computer in pursuit of a user-defined task.

AI CUA 202 obtains, from AI CUA model 210, action 224, such as predicted based on action request 222.

The term "action," as used herein, refers to a discrete operation performed by an AI CUA (e.g., 202) on a computer (e.g., 206) in pursuit of a specified task or goal. An action is typically determined by the AI CUA model in response to an action request and is intended to advance the execution of the task.

Examples of actions include, but are not limited to, mouse clicks, key presses, text input, window manipulations, or any other operation that interacts with the UI of the computer. Each action is executed as part of a sequence of steps defined by a plan, and the successful execution of actions enables the AI CUA to accomplish the desired outcome.

Accordingly, an action (e.g., 224) generally refers to any discrete operation performed by the AI CUA on a computer to progress toward or achieve a given task or goal, as determined by the agent's reasoning and planning processes.

For example, with respect to the example described above regarding obtaining a document from a website, the predicted action (e.g., 224) may include performing a mouse click on a specific UI element such as the "Login" button, link, or other UI element on the website (e.g., at a given position on the UI of computer 206, on the website, or similar). This predicted action may be based on plan 220 (e.g., logging into the website, in the exampled described above).

AI CUA 202 sends, to computer 206, action 224, such as via an instruction to perform action 224 on computer 206.

AI CUA 202 obtains, from computer 206, status 226 related to action 224, such as based on computer 206 having performed action 224.

The term "status," as used herein, refers to information related to the outcome or result of an action performed by an AI CUA (e.g., 202) on a computer (e.g., 206). A status is typically obtained from the computer after the execution of an action and may indicate whether the action was performed successfully or unsuccessfully, as well as provide any relevant output or feedback resulting from the action. The status may include a subsequent observation from the computer, such as after the AI CUA has performed an action from a prior step. The subsequent observation may include, for example, an updated screenshot of the computer after the AI CUA has performed the action from the prior step. In some cases, the difference in status of the execution of an action may be reflected in the difference between screenshots, such as between a current screenshot and an expected screenshot. This difference between screenshots may be interpreted via the AI supervisor model. The difference may also correspond to a vector similarity score, which may be used to assess the degree of deviation between the AI CUA's current or proposed actions (and session behavior) and the established behavioral fingerprint for a specific task, such as described herein with respect to FIG. 3.

For example, status may include confirmation that a document has been successfully downloaded, an error message if an action failed, or other data reflecting the current state of the UI or environment following the execution of the action. Status information is used by the AI CUA to determine whether a task has been completed, whether further actions are required, or whether a new plan or path should be initiated.

Accordingly, a status (e.g., 226) generally refers to the feedback or result obtained from a computer after the AI CUA executes an action, providing information for assessing task progress and guiding subsequent decision-making within the agent's workflow.

For example, with respect to the example described above, status 226 may include information related to whether the document has been successfully downloaded, and/or any other output that may have resulted from action 224 having been performed on computer 206.

In certain aspects, certain steps described above, such as obtaining an observation 216, determining a plan 220, determining an action 224, and performing the action 224 on computer 206, may be repeated to complete the task. The repetition of these steps, such as obtaining an observation and performing an action, is described further with respect to FIG. 6.

Once the task has been determined to have been completed (e.g., based on status 226), AI CUA 202 sends, to UI 204, result 228.

The term "result," as used herein, refers to information provided by an AI CUA (e.g., 202) to a user interface (e.g., 204) or client application that reflects the outcome of a completed task or sequence of actions performed on a computer (e.g., 206). The result is typically based on the status of the last action in a sequence of plans or actions for performing the task.

A result may include confirmation of successful task completion, such as the successful download of a document, or any other output that may have resulted from the execution of the task. The result serves as a final indication to the user or client application regarding whether the intended goal or task has been achieved.

Accordingly, a result (e.g., 228) generally refers to the information communicated by the AI CUA to a user interface or client application, indicating the outcome of a task or sequence of actions, and confirming whether the desired objective has been accomplished.

For example, result 228 may be based on status 226, such as a status of a last action of a sequence of plans or actions for performing the task. When status 226 or result 228 indicates a successful performance or completion of the task, the sequence of actions (actions 224) performed to complete this task may be stored as a path (such as described with respect to FIG. 3, below). To this end, actions 224 (as well as observations 216) used for the completion of a task may be stored, at least temporarily, such that when status 226 or result 228 indicates a successful completion of the task, observations 216 and actions 224 that were used may be stored as a path.

The term "path," as used herein, refers to a sequence of actions performed by an AI CUA (e.g., 202) to complete a specified task or goal on a computer (e.g., 206). A path is typically recorded as a series of successful [observation, action] pairs (e.g., tuples) during the execution of a task and is stored in a data storage device, such as a path database, for future use.

A path may be indexed by its starting conditions, such as the task to be performed, a starting URL, or information related to an initial observation, allowing for rapid retrieval and reuse. When a subsequent task request matches the starting conditions of a stored path, the AI CUA can execute the actions in the path deterministically, without needing to re-interpret the user interface or re-plan the workflow using AI models, thus saving significant computing resources and reducing latency in the overall task execution pipeline. That is, the AI CUA can execute the actions in the path without calling an AI CUA model (e.g., 210), as an example. If the execution of a path deviates from expected observations, the system may fall back to AI-driven reasoning to determine a new path.

Accordingly, a path generally refers to a stored sequence of actions (and associated observations) that defines how the AI CUA performs a particular task, enabling efficient, repeatable, and deterministic automation of user interface interactions.

In some cases, the path may be in the form of a JSON or other data structure, including a sequence of [observation, action] pairs. The steps described with respect to FIG. 2 may be performed as part of workflow or path learning and caching.

Example Artificial Intelligence Computer Use Agent System with Databases

Figure 3:
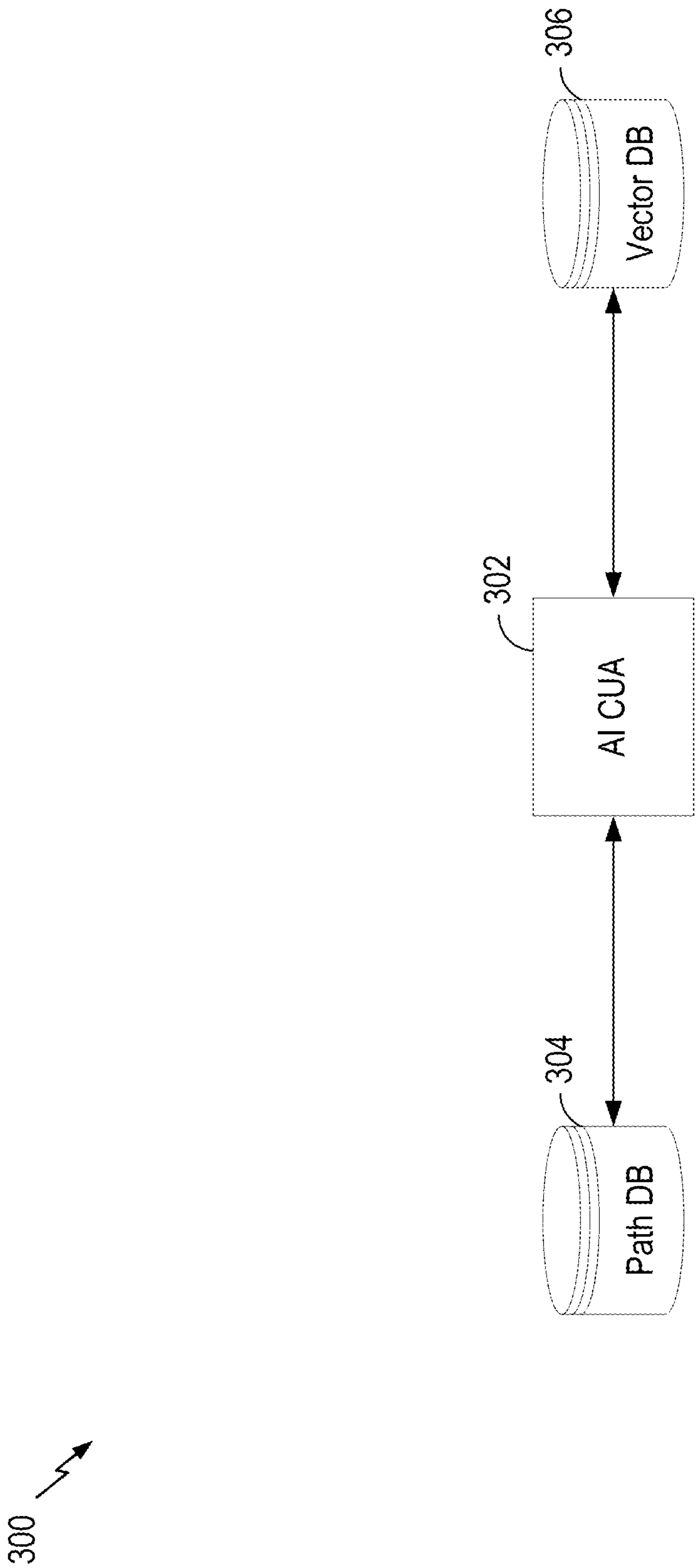
FIG. 3 depicts an example AI CUA system with a path database and a vector database.

FIG. 3 depicts an example AI CUA system 300 with path database 304 and vector database 306, such as used for a tiered execution of a task and reasoning described, below. As depicted, the system 300 includes AI CUA 302, which may be an example of AI CUA 202 described with respect to FIG. 2.

As described above, observations (e.g., observations 216 of FIG. 2) and actions (e.g., actions 224 of FIG. 2) used for a successful completion of a task may be stored as a path, such as via path database 304. A path enables the subsequent performance of the same task by AI CUA 302 without having to determine plans and actions via use of models (e.g., via AI supervisor model 208 or AI CUA model 210), thereby saving significant computing resources and reducing latency of task execution. Instead, AI CUA 302 may identify a stored path based on a comparison of information from, for example, a task request for the subsequent task to the information stored for the stored path. AI CUA 302 may then retrieve and use the identified path to perform the subsequent task. Each path stored via path database 304 may be indexed by its starting condition(s) (e.g., task or goal to be performed, starting URL, and/or information related to an initial observation). Then, the path may be retrieved based on one or more conditions that match the starting conditions associated with the stored path. The matching and the identification described above may be based on a comparison between the one or more conditions and the starting conditions associated with the stored path. In some cases, certain portions of the conditions (e.g., information related to the initial observation) may be vectorized into an embedding, and stored as an embedding. Thus, the comparison performed to identify a stored path, whose associated starting conditions match the starting conditions of a subsequent task request, may include a vector comparison to look for a threshold level of similarity between the two sets of conditions. A vector comparison is an accurate, lightweight (computationally) and low latency method of comparing conditions to identify stored paths.

In certain aspects, when a match of a stored path is found in path database 304, AI CUA 302 executes the actions stored as part of the stored path (e.g., path execution). When no match is found with any stored path, AI CUA 302 falls back to the steps described with respect to FIG. 2, to determine and store a new path.

In some aspects, when a match of a stored path is found in path database 304, and while AI CUA 302 is executing the actions stored as part of the stored path, AI CUA 302 may perform a validation of a resulting observation (e.g., an observation from a computer such as computer 206 of FIG. 2, after the execution of a particular action of the stored path). If the resulting observation matches an expected observation from the stored path, AI CUA 302 may continue to perform the actions stored as part of the stored path. However, if the resulting observation does not match the expected observation (e.g., where an actual position of a given UI element is different from an expected position of the given UI element), AI CUA 302 may fall back to the steps described with respect to FIG. 2 for generating a new path. For example, AI CUA 302 may use the current/resulting observation (e.g., that does not match the expected observation from the stored path), as a starting condition to determine/obtain a new path based on the new starting condition. This process may create a continuous learning loop, as it can determine and store a new path each time the observation resulting from an action deviates from an expected observation, thus resulting in a large variety of paths to be determined and stored, such as corresponding to various starting conditions.

In some aspects, AI CUA 302 may generate a first vector representative of a first observation (e.g., observation 216 of FIG. 2), and store, via a vector database (vector database 306), the first vector. AI CUA 302 may send, to a computer (computer 206 of FIG. 2), a second observation request for a second observation, obtain the second observation, and generate a second vector representative of the second observation. AI CUA 302 may compare the second vector with the first vector to determine a difference between the second vector and the first vector, and sending an instruction to execute a path may be based on comparing the second vector with the first vector. In certain cases, the difference may be derived from computer-use datasets, such as including observations (e.g., screenshots) from the computer. In some aspects, sending the instruction based on comparing the second vector with the first vector includes: determining an anomaly score based on the difference between the second vector and the first vector, and sending the instruction to execute the path on the computer based on the anomaly score satisfying a threshold. In some examples, a binary hash or a vector similarity score of the observations (e.g., screenshots) may be used for setting a threshold associated with the difference between the second vector and the first vector or a threshold associated with the anomaly score.

The term "anomaly score," as used herein, refers to a quantitative measure calculated (e.g., by the supervisory framework of an AI CUA) to assess the degree of deviation between the AI CUA's current or proposed actions (and session behavior) and the established behavioral fingerprint for a specific task. The behavioral fingerprint is a statistical model of normal or expected behavior, built from aggregated data of successful task executions and may include metrics such as timing per step, types of UI elements interacted with, and the sequence of navigation.

In some aspects, the anomaly score is determined by comparing the agent's actions and observations during live operation against the stored fingerprint. Deviations, such as performing an unexpected action, interacting with an unusual UI element, or taking an atypical amount of time, are quantified, and the resulting score reflects how far the current behavior diverges from the norm. If the anomaly score exceeds a defined threshold, the framework may trigger guardrail enforcement actions, such as pausing the agent, requiring human approval, terminating the session, or flagging the event for review.

Accordingly, an anomaly score generally refers to a computed value that indicates the extent to which the AI CUA's behavior during task execution differs from the expected patterns defined by the behavioral fingerprint, and is used to guide real-time intervention and control within the agent's workflow.

As an example, sending the second instruction based on comparing the second vector with the first vector includes: determining an anomaly score based on the difference between the second vector and the first vector, and based on the anomaly score not satisfying a threshold, sending, to a user interface, a request for approval to send the instruction to execute the path on the computer. For example, AI CUA 302 may send the instruction to execute the path upon obtaining a user approval to send the instruction to execute the path on the computer.

In certain aspects, the observations (as well as other information) of a stored path may be stored as a "fingerprint model" of the stored path. For example, the fingerprint model (also referred to as fingerprint described above) of the stored path may be a statistical model of "normal" (expected) behavior for a specific task associated with the stored path. This fingerprint may define the expected ranges, sequences, and patterns for the stored data, such as collected metrics related to positions of UI elements, etc. (e.g., using mean or standard deviation, Hidden Markov Models, an autoencoder, etc.). That is, the fingerprint model may be built through multiple observations of successful paths, and may aggregate data across multiple path executions of a task. As an example, the AI CUA may execute logging into a website 1,000 times. Across these executions, the AI CUA may aggregate execution times at each step of each execution, and determine, for example, that the step to enter a user's email address takes 3 seconds on average, with a standard deviation of 1 second. In some cases, the fingerprint of the stored path may be encoded in a vectorized form, and stored via vector database 306 of FIG. 3.

In some aspects, AI CUA 302 may compare an observation of a live performance of a task with the information saved as part of the fingerprint, such as via a separate component (e.g., a dedicated module), such that a validation of an action based on an observation, etc. may be performed before the action is executed. In certain cases, AI CUA 302 may perform such comparison for each action of the performance of the task. As an example, AI CUA 302 may determine an anomaly score based on the comparison, to determine whether a current performance of a task may continue based on the actions of a stored path, or if AI CUA 302 needs to fall back to determining and performing a new path.

In some aspects, AI CUA 302 may obtain an indication of an anomaly during the execution of a path. AI CUA 302 may perform, based on obtaining the indication of the anomaly during the execution of the path, one or more of the following: sending an instruction to pause the execution of the path, sending an alert related to the anomaly, or sending an instruction to terminate the execution of the path.

In certain aspects, determining the anomaly score may include comparing the AI CUA's next, proposed action as well as the actions that have already been performed, and related information such as associated observations, with the stored fingerprint. The AI CUA may calculate the anomaly score based on any deviations in the performance of previous actions or the next action, from the stored fingerprint. When the anomaly score does not exceed a threshold, the actions of the saved path may continue. When the anomaly score exceeds the threshold (e.g., indicating that the deviation is more than a threshold level), a "guardrail" feature may be implemented (e.g., enforced) by AI CUA 302. For example, with respect to the example of executing logging into a website 1,000 times, described above, if entering a user's email address took 45 seconds during an execution of this step, the AI CUA may flag this execution as an anomaly, such as being beyond a certain number (e.g., 5) of standard deviations above the mean of 3 seconds. As another example, if a stored fingerprint for changing a password may indicate 0% probability for clicking a button labeled "Delete Account," and an execution of a password changing step included clicking a button labeled "Delete Account," the AI CUA may flag this execution as an anomaly, with the 0% probability associated with the observed action being below a given probability threshold.

The term "guardrail," as used herein, refers to a mechanism or feature within the AI CUA framework that is configured to prevent unwanted or unsafe behavior by the agent during the execution of tasks. Guardrails operate by establishing boundaries or constraints, often informed by a behavioral fingerprint or statistical model of normal task execution, against which the AI CUA's actions and session behavior are continuously monitored.

When the AI CUA's proposed or ongoing actions significantly deviate from the expected patterns (as indicated, for example, by an anomaly score exceeding a defined threshold), the guardrail framework intervenes to enforce safety and compliance. Such intervention may include pausing the agent and requiring human operator approval to proceed, immediately terminating the agent's session, securely logging the event for later review, or alerting relevant stakeholders.

Accordingly, a guardrail generally refers to any system, process, or control within the AI CUA framework that dynamically restricts, monitors, or intervenes in the agent's behavior to ensure it remains safely scoped to its intended task and prevents undesired or potentially harmful actions.

As an example, AI CUA 302 may pause the execution of the stored path (and prompt a user for a human intervention to obtain an approval to proceed), or immediately end the execution of the stored path (and store any relevant information, such as the actions that have already been performed, the next action, the stored path, the anomaly score, etc., in a log, for subsequent analysis). As another example, AI CUA 302 may flag the deviation, such as in a log, while continuing with the next action(s) of the stored path. In some cases, a threshold related to the deviation may be set such as to allow "fuzzy matching" (a technique that finds approximate matches, rather than requiring an exact character-by-character match in the example of a string comparison) and increase matches with the stored paths.

Figure 4:
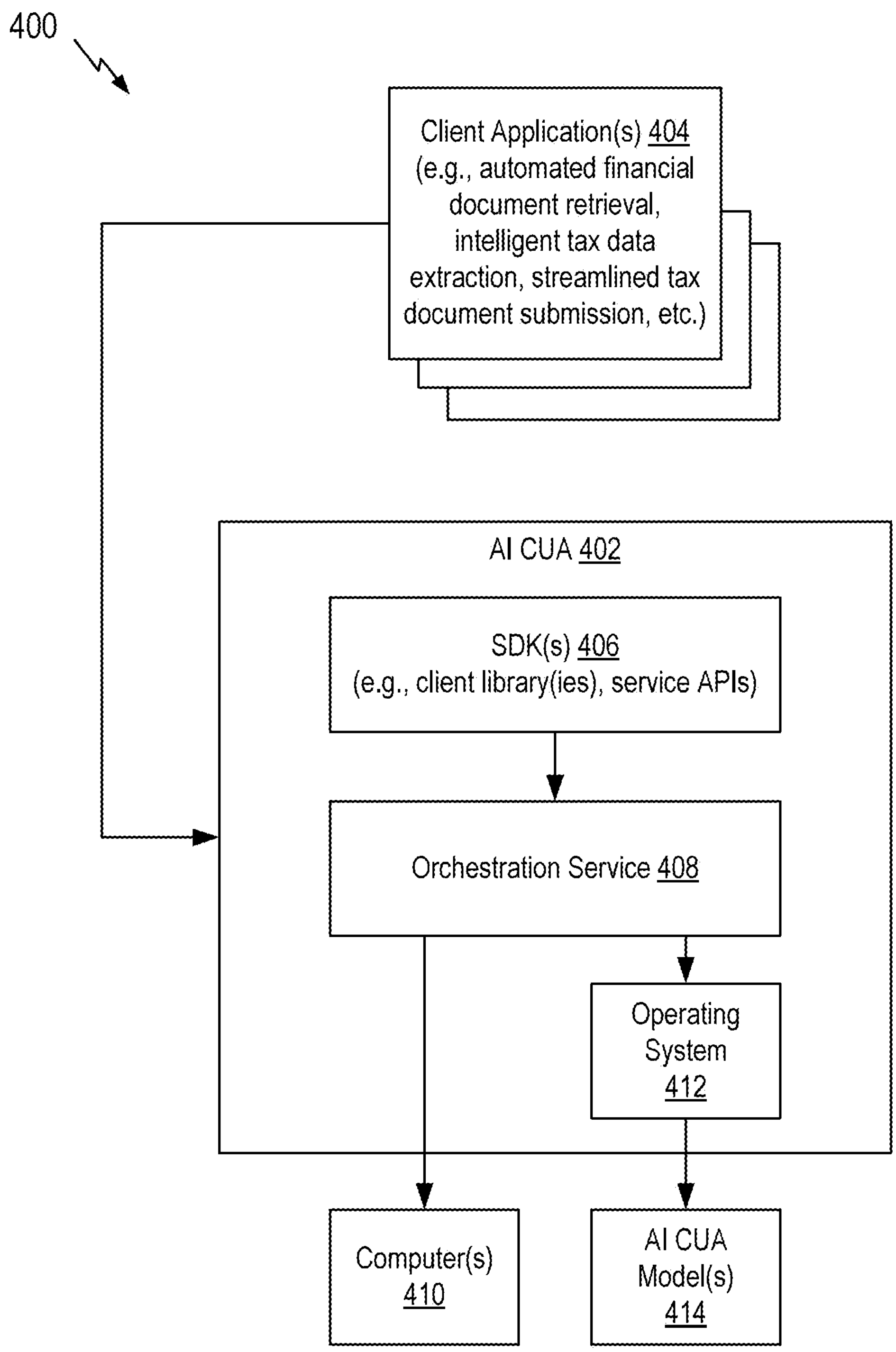
FIG. 4 depicts an example AI CUA system with one or more client applications.

Example Artificial Intelligence Computer Use Agent System with Client Applications FIG. 4 depicts an example AI CUA system 400 with one or more client applications 404. As depicted, the system 400 includes AI CUA 402 and the one or more client applications 404 that are in data communication with AI CUA 402. AI CUA 402 may be an example of AI CUA 202 of FIG. 2 or AI CUA 302 of FIG. 3. As similarly described with respect to certain corresponding components of FIG. 2, AI CUA 402 is in data communication with or uses computer(s) 410 (e.g., an example of computer 206 of FIG. 2) and AI CUA model(s) 414 (e.g., an example of AI CUA model 210 of FIG. 2).

In the depicted example, AI CUA 402 includes one or more SDKs 406, such as one or more client libraries, service API(s) used for interacting with the client applications 404 or other components or tools of AI CUA 402. For example, AI CUA 402 includes an orchestration service 408 that manages connections to computer(s) 410 as well as an operating system 412 for using AI CUA model(s) 414. In certain aspects, a client application 404 may include any interface, application, or agent built upon the capabilities of AI CUA 402, such as pure user interfaces, headless API requests to AI CUA 402, or other AI agents which utilize the capabilities of AI CUA 402. In some cases, the client application 404 may be an application for automated financial document retrieval, intelligent tax data extraction, streamlined tax document submission, etc.

As similarly described with respect to UI 204 of FIG. 2, the client applications 404 may send tasks requests to AI CUA 402 for certain tasks, based on which AI CUA 402 may determine a workflow for performing the tasks. AI CUA 402 may perform obtaining observations, determining plans and actions, and instructing a connected computer to execute the actions, etc., as similarly described with respect to FIG. 2. In some cases, a user may provide a task request through a client application 404, which sends the task request to AI CUA 402.

In certain aspects, the client applications 404 may be of various types, such as for various use cases corresponding to different practical applications of the aspects described herein.

For example, certain aspects of the present disclosure may be used for document acquisition and management. The AI CUA framework described herein may automate the retrieval of various document types from diverse web sources, including those requiring login or complex navigation. This also includes managing these documents post-acquisition, such as archiving or routing.

As another example, certain aspects may be used for document upload and submission. The AI CUA framework described herein may automate the process of uploading documents to websites, web applications, or online portals, including navigating forms and/or confirming submission.

As another example, certain aspects may be used for data acquisition, aggregation, and formatting. The AI CUA framework described herein may extract structured and/or unstructured data from a multitude of web sources, then clean, transform, and format it into usable datasets for analysis, reporting, or system integration.

As another example, certain aspects may be used for automated, web-restricted interactions and web automations. The AI CUA framework described herein may navigate and perform complex, multi-step operations within web applications, such as those requiring user authentication, session management, or interaction with dynamic content.

As another example, certain aspects may be used for web-driven data analysis. The AI CUA framework described herein may play a role in gathering, preparing, and continuously monitoring web data that feeds into analytical processes or triggers alerts. These aspects may also perform "operational analysis" of web pages to guide its actions.

As another example, certain aspects may be used for website and application testing. The AI CUA framework described herein may automate the testing of web application functionality, user interface consistency, and/or user experience flows by simulating human interactions.

As another example, certain aspects may be used for compliance monitoring and audit trail generation. The AI CUA framework described herein may automate interactions with web systems to gather evidence for regulatory compliance, perform mandated checks, or execute actions that require a verifiable audit trail (e.g., via screenshots, interaction logs captured by AI CUA 402). As another example, certain aspects may be used for webpage guidance. These aspects may be used for automated, guided flows for users to gain webpage usability insights.

Example User Interface of Artificial Intelligence Computer Use Agent System

Figure 5:
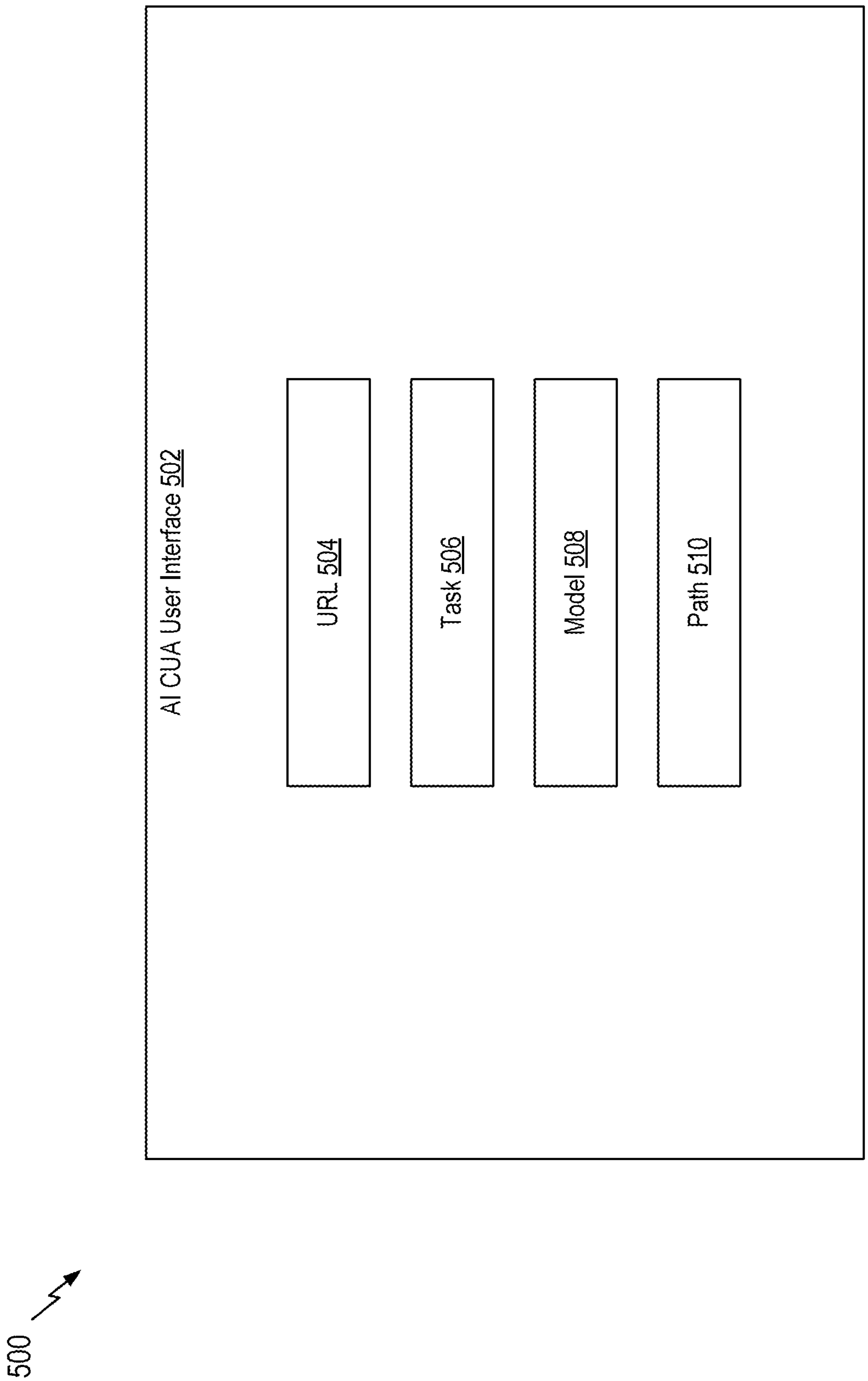
FIG. 5 depicts an example user interface (UI) of an AI CUA system.

FIG. 5 depicts an example UI 500 of an AI CUA system (e.g., including AI CUA 202 of FIG. 2, AI CUA 302 of FIG. 3, or AI CUA 402 of FIG. 4). The UI 500 includes AI CUA UI 502 for interacting with the AI CUA system, such as described herein.

AI CUA UI 502 includes a URL UI element 504, a task UI element 506, a model UI element 508, and a path UI element 510. As described with respect to observation request 214 of FIG. 2, the URL UI element 504 may be used to provide or implement a UI for entering a starting URL for submitting a task request.

The task UI element 506 may be used to provide or implement a UI for selecting a task (e.g., from a set of tasks, such as known tasks associated with stored paths) or entering a new task, for submitting the task request. The task may correspond to, for example, the task described with respect to task request 212 of FIG. 2. In some cases, when a new task is entered, the new task may be sent to an AI CUA model described herein, such as AI CUA model 210 of FIG. 2, where the AI CUA model may provide a task, such as a definition of a task, which can be processed by an AI CUA. For example, an AI CUA, such as AI CUA 202 of FIG. 2, may send, to the AI CUA model, a new task from a user, and obtain, from the AI CUA model, a task that can be processed by the AI CUA.

The model UI element 508 may be used to provide or implement a UI for selecting a model to use, such as when more than one model may be available for use with AI CUA (e.g., fine-tuned for certain knowledge domains, etc.). For example, when an AI supervisor model or an AI CUA model is fine-tuned for multiple knowledge domains, each fine-tuned model may be available for selection via the model UI element 508.

The path UI element 510 may be used to provide or implement a UI for selecting a stored path for execution (e.g., when a known task is selected to be performed). For example, the stored path may correspond to, for example, the stored path described with respect to FIG. 3. The UI 500 is an example, and other variations of UI may also be possible, consistent with the present disclosure, such as to include additional or less UI elements.

Example Process Flow for Automated Interaction with a User Interface

Figure 6:
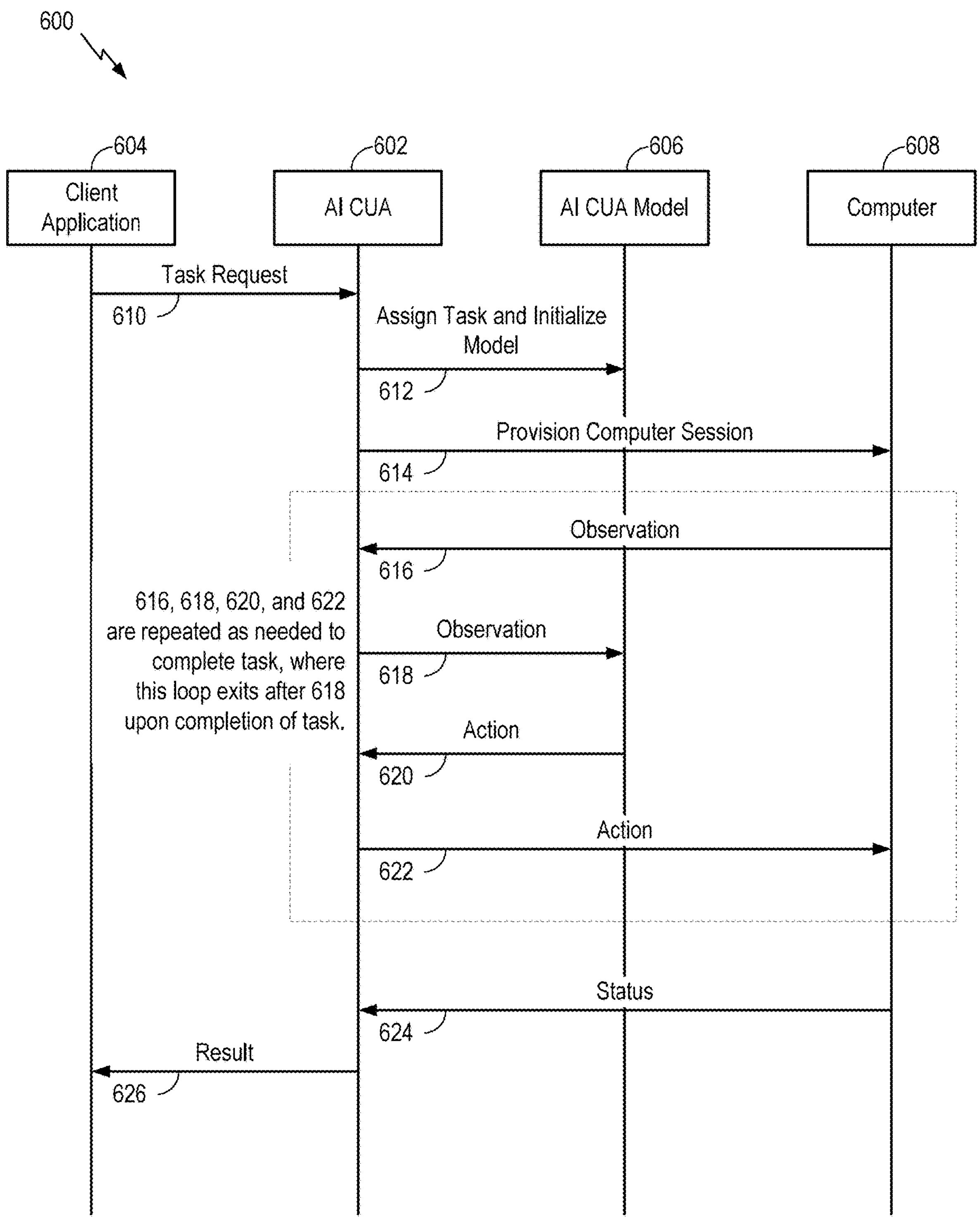
FIG. 6 depicts an example process flow between AI CUA, a client application, an AI CUA model, and a computer.

FIG. 6 depicts an example process flow 600 between AI CUA 602, a client application 604, an AI CUA model 606, and a computer 608. In certain aspects, AI CUA 602 may be an example of AI CUA 202 of FIG. 2, AI CUA 302 of FIG. 3, or AI CUA 402 of FIG. 4. The client application 604 may an example of the client application(s) 404 of FIG. 4. The AI CUA model 606 may be an example of AI CUA model 210 of FIG. 2 or AI CUA model(s) 414 of FIG. 4. The computer 608 may be an example of computer 206 of FIG. 2 or computer(s) 410 of FIG. 4.

At 610, AI CUA 602 obtains, from client application 604 (and client application 604 sends), a task request for a task. This task request may be an example of the task request 212 described with respect to FIG. 2.

At 612, AI CUA 602 assigns the task to AI CUA model 606, and initializes AI CUA model 606. For example, AI CUA 602 may establish a connection with AI CUA model 606, where such connection may be initialized with the requested task (e.g., from 610). The AI CUA framework (AI CUA 602) may be a consumer of certain tools of AI CUA model 606, such as certain AI CUA model APIs.

At 614, AI CUA 602 provisions a computer session with computer 608, such as to communicate with computer 608. For example, AI CUA 602 may communicate with computer 608 to obtain an observation, send an instruction to perform an action, etc., as described with respect to FIG. 2.

At 616, AI CUA 602 obtains, from computer 608 (and computer 608 sends), an observation. For example, the observation obtained at 616 may be an example of observation 216 described with respect to FIG. 2. In some aspects, AI CUA 602 sends, to computer 608, an observation request for the observation, where the observation is related to a task, and AI CUA 602 obtains the observation based on (e.g., in response to) the observation request.

At 618, AI CUA 602 sends, to AI CUA model 606 (and AI CUA model 606 obtains), the observation. For example, AI CUA model 606 may use the observation to obtain a plan based on the observation, and then an action based on the plan, such as described with respect to FIG. 2.

At 620, AI CUA 602 obtains, from AI CUA model 606 (and AI CUA model 606 sends), the action. For example, the action obtained at 620 may be an example of action 224 described with respect to FIG. 2. In some aspects, AI CUA 602 sends, to an AI supervisor model (e.g., an example of AI supervisor model 208 of FIG. 2), a plan request for a plan related to execution of a task. AI CUA 602 obtains, from the AI supervisor model, the plan, wherein the plan includes one or more steps related to the execution of the task. AI CUA 602 then sends, to AI CUA model 606, the observation and an action request for an action related to the one or more steps, and AI CUA 602 obtains the action based on (e.g., in response to) the action request.

At 622, AI CUA 602 sends, to computer 608 (and computer 608 obtains), the action. For example, AI CUA 602 may send an instruction to execute the action on computer 608, such as described with respect to FIG. 2.

In certain aspects, as similarly described with respect to FIGS. 2, 616, 618, 620, and 622 are repeated as needed to complete a task, such as the task requested at 610. For examples, AI CUA 602 may loop through and repeat 616, 618, 620, and 622, in part or in their entirety, to iterate through the steps for completing a task. When an observation obtained at 618 during one of the iterations indicates that the task is complete, AI CUA 602 may exit out of such loop, and proceed to 624.

At 624, AI CUA 602 obtains, from computer 608 (and computer 608 sends), a status of, or related to, the execution of the action. The status obtained at 624 may be an example of status 226 described with respect to FIG. 2.

At 626, AI CUA 602 sends, to client application 604 (and client application 604 obtains), a result of the completion of the task. For example, the result from 626 may be an example of 228 described with respect to FIG. 2.

In some aspects, AI CUA 602 determines that the task has been executed successfully based on the action (e.g., based on the result). AI CUA 602 then stores, via a data storage device (e.g., path database 304 of FIG. 3), a path related to the task based on determining that the task has been executed successfully based on the action, where the path includes the action.

In some aspects, at least one of (1) determining that the task has been executed successfully based on the action, or (2) determining that the path has been executed successfully includes: obtaining, from computer 608, a result of the task or of the path, sending, to client application 604, the result, and obtaining, from client application 604, a feedback including an indication of a successful execution of the task or of a successful execution of the path. In some aspects, the client application includes a user interface, and the feedback includes a user feedback from a user (where a user is confirming that the path or the task was executed successfully based on the result of the task or of the path.

In some aspects, AI CUA 602 may determine that a previous path has not been executed successfully, where the previous path is: related to the task (e.g., the same task), includes another action related to the one or more steps discussed with respect to 620, and stored via the data storage device prior to the path described above being stored, where sending the observation request discussed with respect to 616 is based on determining that the previous path has not been executed successfully.

In some aspects, AI CUA 602 may determine that the path has not been executed successfully. When the path has not been executed successfully, AI CUA 602 may send, to computer 608, another observation request for another observation, and then obtain, from computer 608, the other observation. AI CUA 602 may then send, to the AI supervisor model discussed above with respect to 620, another plan request for another plan related to the execution of the task, and obtain, from the AI supervisor model, the other plan. The other plan may include one or more other steps related to the execution of the task. AI CUA 602 may send, to AI CUA model 606, the other observation and another action request for another action related to the one or more other steps, and obtain, from AI CUA model 606, the other action. AI CUA 602 may then send, to computer 608, an additional instruction to perform the other action on the computer, and determine that the task has been executed successfully based on the other action. AI CUA 602 may store, via the data storage device (e.g., path database 304 of FIG. 3), another path related to the task based on determining that the task has been executed successfully based on the other action, where the other path may include the other action. In some aspects, storing the other path includes: updating the path (the first path) by removing the action (the first action) from the path and adding the other action to the path to form an updated path; and storing the updated path as the other path.

In some aspects, AI CUA 602 obtains a task request (e.g., a subsequent task request) for the same task for which the path has been stored. AI CUA 602 obtains, from the data storage device, the stored path. AI CUA 602 sends, to computer 608, an instruction to execute the path on the computer.

Example Method for Automated Interaction with a User Interface

Figure 7:
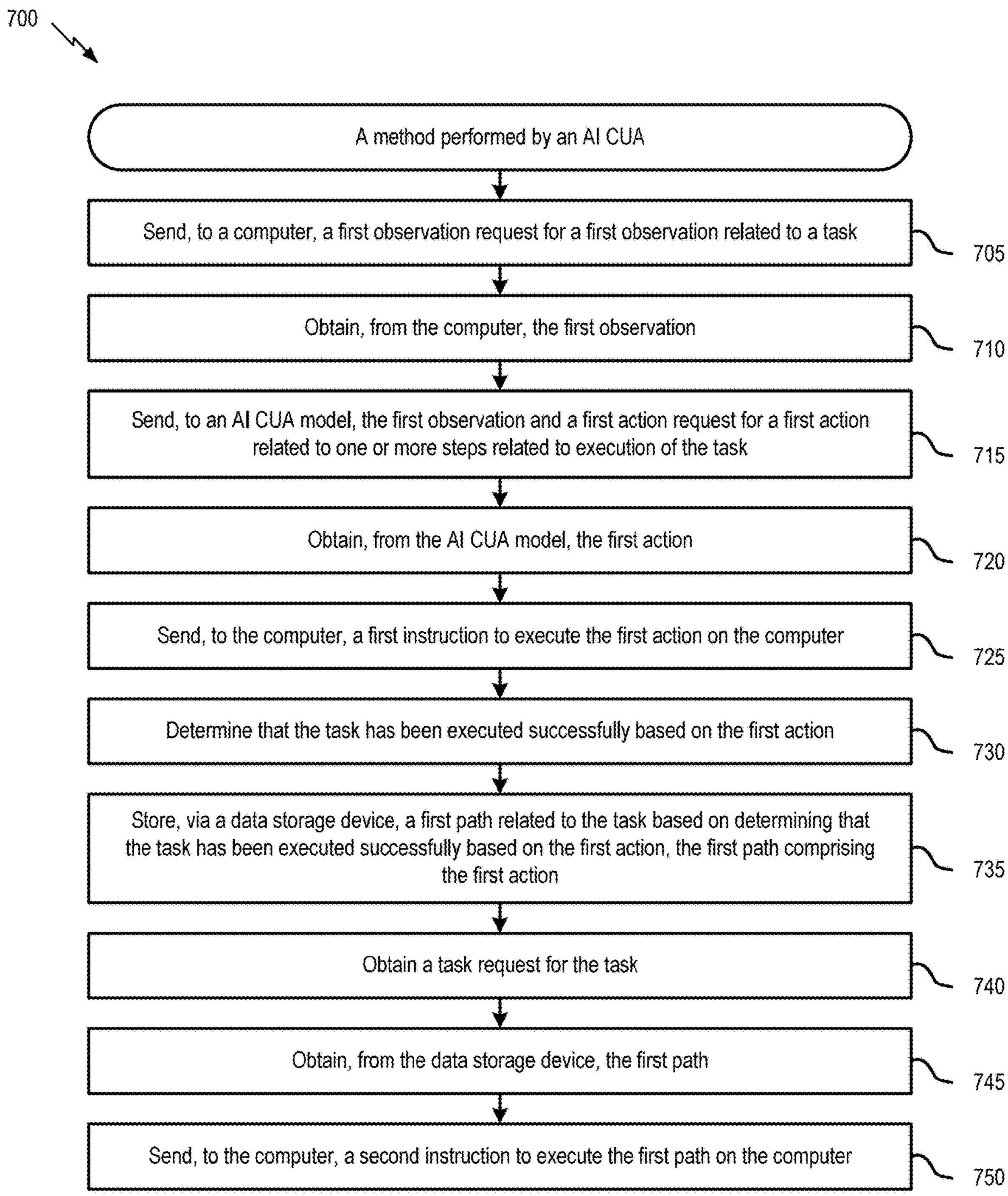
FIG. 7 depicts a method for automated interaction with a UI by an AI CUA.

FIG. 7 depicts an example method 700 performed by an AI CUA (e.g., an example of AI CUA 202 of FIG. 2, AI CUA 302 of FIG. 3, AI CUA 402 of FIG. 4, or AI CUA 602 of FIG. 6). In one aspect, method 700 can be implemented by the system 100 of FIG. 1 and/or processing system 800 of FIG. 8.

Method 700 begins at block 705 with sending, to a computer, a first observation request for a first observation related to a task. In certain aspects, the first observation request being sent at block 705 may be an example of the observation request 214 described with respect to FIG. 2.

Method 700 then proceeds to block 710 with obtaining, from the computer, the first observation. In certain aspects, the first observation being obtained at block 710 may be an example of the observation 216 described with respect to FIG. 2.

In some aspects, method 700 further includes sending, to an AI supervisor model, a plan request for a plan related to execution of the task. In certain aspects, the plan request being sent may be an example of the plan request 218 described with respect to FIG. 2. In certain aspects, the AI supervisor model may be an example of AI supervisor model 208 described with respect to FIG. 2.

In some aspects, method 700 further includes obtaining, from the AI supervisor model, the plan, wherein the plan comprises one or more steps related to the execution of the task. In certain aspects, the plan being obtained may be an example of the plan 220 described with respect to FIG. 2.

Method 700 then proceeds to block 715 with sending, to an AI CUA model, the first observation and a first action request for a first action related to the one or more steps (one or more steps related to execution of the task). In certain aspects, the first action may an example of the action 224 described with respect to FIG. 2. In certain aspects, the AI CUA model may be an example of AI CUA model 210 described with respect to FIG. 2 or AI CUA model 606 described with respect to FIG. 6.

Method 700 then proceeds to block 720 with obtaining, from the AI CUA model, the first action. In certain aspects, obtaining the first action may be an example of obtaining the action 224 described with respect to FIG. 2.

Method 700 then proceeds to block 725 with sending, to the computer, a first instruction to execute the first action on the computer. In certain aspects, sending the first instruction may be an example of sending an instruction to execute the action 224 described with respect to FIG. 2.

Method 700 then proceeds to block 730 with determining that the task has been executed successfully based on the first action. In certain aspects, determining that the task has been executed successfully may be an example of determining that the task has been executed successfully based on the action 224 described with respect to FIG. 2.

Method 700 then proceeds to block 735 with storing, via a data storage device, a first path related to the task based on determining that the task has been executed successfully based on the first action, the first path comprising the first action. In certain aspects, storing the first path may be an example of storing a path via path database 304 described with respect to FIG. 3.

Method 700 then proceeds to block 740 with obtaining a task request for the task. In certain aspects, obtaining the task request may be an example of obtaining the task request 212 described with respect to FIG. 2.

Method 700 then proceeds to block 745 with obtaining, from the data storage device, the first path. In certain aspects, obtaining the first path may be an example of retrieving a path from path database 304 described with respect to FIG. 3.

Method 700 then proceeds to block 750 with sending, to the computer, a second instruction to execute the first path on the computer. In certain aspects, sending the second instruction may be an example of sending an instruction to execute a path from path database described with respect to FIG. 3.

In some aspects, method 700 further includes determining that a previous path has not been executed successfully, wherein the previous path is: related to the task, comprises a second action related to the one or more steps, and stored via the data storage device prior to the first path being stored, wherein sending the first observation request is based on determining that the previous path has not been executed successfully.

In some aspects, method 700 further includes determining that the first path has not been executed successfully.

In some aspects, method 700 further includes sending, to the computer, a second observation request for a second observation.

In some aspects, method 700 further includes obtaining, from the computer, the second observation.

In some aspects, method 700 further includes sending, to the AI supervisor model, a second plan request for a second plan related to the execution of the task.

In some aspects, method 700 further includes obtaining, from the AI supervisor model, the second plan, wherein the second plan comprises one or more other steps related to the execution of the task.

In some aspects, method 700 further includes sending, to the AI CUA model, the second observation and a second action request for a second action related to the one or more other steps (one or more other steps related to the execution of the task).

In some aspects, method 700 further includes obtaining, from the AI CUA model, the second action.

In some aspects, method 700 further includes sending, to the computer, a third instruction to perform the second action on the computer.

In some aspects, method 700 further includes determining that the task has been executed successfully based on the second action.

In some aspects, method 700 further includes storing, via the data storage device, a second path related to the task based on determining that the task has been executed successfully based on the second action, the second path comprising the second action.

In some aspects, storing the second path comprises: updating the first path by removing the first action from the first path and adding the second action to the first path to form an updated first path; and storing the updated first path as the second path.

In some aspects, block 750 includes sending the second instruction without calling the AI CUA model.

In some aspects, method 700 further includes determining that the first path has been executed successfully, wherein at least one of (1) determining that the task has been executed successfully based on the first action, or (2) determining that the first path has been executed successfully comprises: obtaining, from the computer, a result of the task or of the first path, sending, to a client application, the result, and obtaining, from the client application, a feedback comprising an indication of a successful execution of the task or of a successful execution of the first path.

In some aspects, the client application comprises a user interface, and the feedback comprises a user feedback from a user.

In some aspects, the task comprises a new task from a user, and the method 700 further comprises: sending, to the AI CUA model, the new task; and obtaining, from the AI CUA model, the task.

In some aspects, method 700 further includes generating a first vector representative of the first observation.

In some aspects, method 700 further includes storing, via a vector database, the first vector.

In some aspects, method 700 further includes sending, to the computer, a second observation request for a second observation.

In some aspects, method 700 further includes obtaining, from the computer, the second observation.

In some aspects, method 700 further includes generating a second vector representative of the second observation.

In some aspects, method 700 further includes comparing the second vector with the first vector to determine a difference between the second vector and the first vector, wherein block 750 includes sending the second instruction based on comparing the second vector with the first vector.

In some aspects, sending the second instruction based on comparing the second vector with the first vector comprises: determining an anomaly score based on the difference between the second vector and the first vector; and sending the second instruction to execute the first path on the computer based on the anomaly score satisfying a threshold.

In some aspects, sending the second instruction based on comparing the second vector with the first vector comprises: determining an anomaly score based on the difference between the second vector and the first vector; based on the anomaly score not satisfying a threshold, sending, to a user interface, a request for approval to send the second instruction to execute the first path on the computer; obtaining a user approval to send the second instruction to execute the first path on the computer; and sending the second instruction to execute the first path on the computer based on the user approval.

In some aspects, method 700 further includes obtaining, from the computer, an indication of an anomaly during the execution of the first path.

In some aspects, method 700 further includes performing, based on obtaining the indication of the anomaly during the execution of the first path, one or more of: sending, to the computer, an instruction to pause the execution of the first path; sending, to a user interface, an alert related to the anomaly; or sending, to the computer, an instruction to terminate the execution of the first path.

In some aspects, the first observation request comprises an indication of an initial action related to obtaining the first observation.

In some aspects, the computer is an instance of a virtual computer in data communication with the AI CUA.

In some aspects, the computer is a physical computer in data communication with the AI CUA.

In some aspects, the first instruction to execute the first action on the computer comprises an instruction to execute the first action on a web browser on the computer.

In some aspects, block 750 includes an instruction to execute the first path on a web browser on the computer.

The techniques for automated interaction with a UI by an AI CUA described with respect to method 700 enable reduced latency and compute usage in the technical field of controlling a computer. The reduced latency and compute usage is due to path caching that allows a path for performing a task to be re-used for performing the task, such as without expending the compute resources to interpret a UI, plan a workflow, etc. (e.g., without calling an AI model) for each iteration of performance of the task.

Note that FIG. 7 is just one example of a method, and other methods including fewer, additional, or alternative operations are possible consistent with this disclosure.

Example Processing System for Automated Interaction with a User Interface

Figure 8:
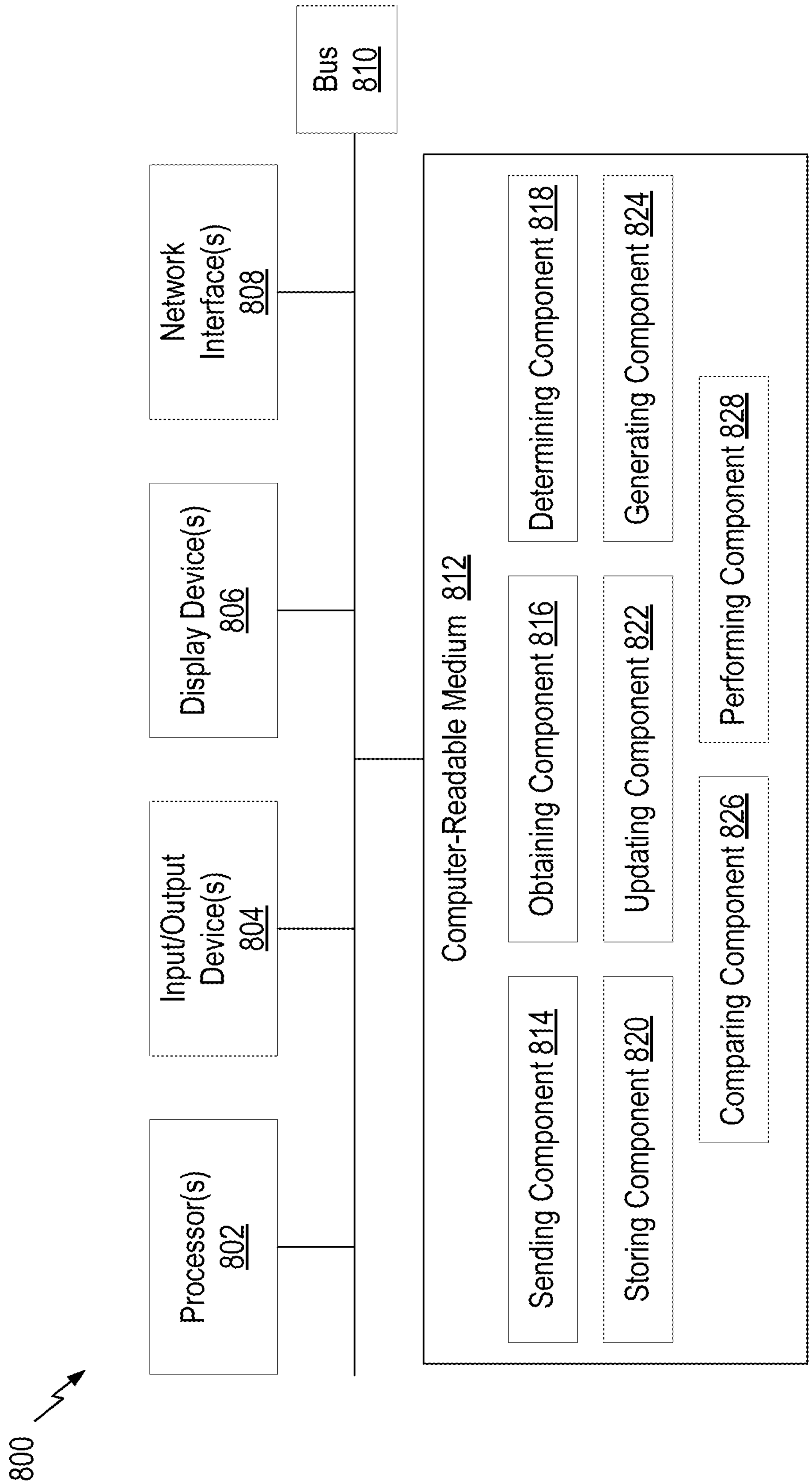
FIG. 8 depicts an example processing system with which aspects of the present disclosure can be performed.

FIG. 8 depicts an example processing system 800 configured to perform various aspects described herein, including, for example, method 700 as described above with respect to FIG. 7.

Processing system 800 is an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 800 includes one or more processors 802, one or more input/output devices 804, one or more display devices 806, one or more network interfaces 808 through which processing system 800 is connected to one or more networks (e.g., a local network, an intranet, the Internet, or any other group of processing systems communicatively connected to each other), and computer-readable medium 812. In the depicted example, the aforementioned components are coupled by a bus 810, which may generally be configured for data exchange amongst the components. Bus 810 may be representative of multiple buses, while only one is depicted for simplicity.

Processor(s) 802 are generally configured to retrieve and execute instructions stored in one or more memories, including local memories like computer-readable medium 812, as well as remote memories and data stores. Similarly, processor(s) 802 are configured to store application data residing in local memories like the computer-readable medium 812, as well as remote memories and data stores. More generally, bus 810 is configured to transmit programming instructions and application data among the processor(s) 802, display device(s) 806, network interface(s) 808, and/or computer-readable medium 812. In certain embodiments, processor(s) 802 are representative of one or more central processing units (CPUs), graphics processing unit (GPUs), tensor processing unit (TPUs), accelerators, and other processing devices.

Input/output device(s) 804 may include any device, mechanism, system, interactive display, and/or various other hardware and software components for communicating information between processing system 800 and a user of processing system 800. For example, input/output device(s) 804 may include input hardware, such as a keyboard, touch screen, button, microphone, speaker, and/or other device for receiving inputs from the user and sending outputs to the user.

Display device(s) 806 may generally include any sort of device configured to display data, information, graphics, user interface elements, and the like to a user. For example, display device(s) 806 may include internal and external displays such as an internal display of a tablet computer or an external display for a server computer or a projector. Display device(s) 806 may further include displays for devices, such as augmented, virtual, and/or extended reality devices. In various embodiments, display device(s) 806 may be configured to display a graphical user interface.

Network interface(s) 808 provide processing system 800 with access to external networks and thereby to external processing systems. Network interface(s) 808 can generally be any hardware and/or software capable of transmitting and/or receiving data via a wired or wireless network connection. Accordingly, network interface(s) 808 can include a communication transceiver for sending and/or receiving any wired and/or wireless communication.

Computer-readable medium 812 may be a volatile memory, such as a random access memory (RAM), or a nonvolatile memory, such as nonvolatile random access memory (NVRAM), or the like. In this example, computer-readable medium 812 includes sending component 814, obtaining component 816, determining component 818, storing component 820, updating component 822, generating component 824, comparing component 826, and performing component 828. Processing of the components 814-828 may enable and cause the processing system 800 to perform the method 700 described with respect to FIG. 7, or any aspect related to it.

In certain embodiments, sending component 814 is configured to send, to a computer, a first observation request for a first observation related to a task, as described in FIG. 7 with reference to block 705. In certain embodiments, obtaining component 816 is configured to obtain, from the computer, the first observation, as described in FIG. 7 with reference to block 710. In certain embodiments, sending component 814 is configured to send, to an AI CUA model, the first observation and a first action request for a first action related to the one or more steps, as described in FIG. 7 with reference to block 715. In certain embodiments, obtaining component 816 is configured to obtain, from the AI CUA model, the first action, as described in FIG. 7 with reference to block 720. In certain embodiments, sending component 814 is configured to send, to the computer, a first instruction to execute the first action on the computer, as described in FIG. 7 with reference to block 725. In certain embodiments, determining component 818 is configured to determine that the task has been executed successfully based on the first action, as described in FIG. 7 with reference to block 730. In certain embodiments, storing component 820 is configured to store, via a data storage device, a first path related to the task based on determining that the task has been executed successfully based on the first action, the first path comprising the first action, as described in FIG. 7 with reference to block 735. In certain embodiments, obtaining component 816 is configured to obtain a task request for the task, as described in FIG. 7 with reference to block 740. In certain embodiments, obtaining component 816 is configured to obtain, from the data storage device, the first path, as described in FIG. 7 with reference to block 745. In certain embodiments, sending component 814 is configured to send, to the computer, a second instruction to execute the first path on the computer, as described in FIG. 7 with reference to block 750.

Note that FIG. 8 is just one example of a processing system consistent with aspects described herein, and other processing systems having additional, alternative, or fewer components are possible consistent with this disclosure.

Example Clauses

Implementation examples are described in the following numbered clauses:

Clause 1: A method performed by an AI CUA, comprising: sending, to a computer, a first observation request for a first observation related to a task; obtaining, from the computer, the first observation; sending, to an AI CUA model, the first observation and a first action request for a first action related to one or more steps related to execution of the task; obtaining, from the AI CUA model, the first action; sending, to the computer, a first instruction to execute the first action on the computer; determining that the task has been executed successfully based on the first action; storing, via a data storage device, a first path related to the task based on determining that the task has been executed successfully based on the first action, the first path comprising the first action; obtaining a task request for the task; obtaining, from the data storage device, the first path; and sending, to the computer, a second instruction to execute the first path on the computer.

Clause 2: The method of Clause 1, further comprising: determining that a previous path has not been executed successfully, wherein the previous path is: related to the task, comprises a second action related to the one or more steps, and stored via the data storage device prior to the first path being stored, wherein sending the first observation request is based on determining that the previous path has not been executed successfully.

Clause 3: The method of any one of Clauses 1-2, further comprising: determining that the first path has not been executed successfully; sending, to the computer, a second observation request for a second observation; obtaining, from the computer, the second observation; sending, to the AI CUA model, the second observation and a second action request for a second action related to one or more other steps related to the execution of the task; obtaining, from the AI CUA model, the second action; sending, to the computer, a third instruction to perform the second action on the computer; determining that the task has been executed successfully based on the second action; and storing, via the data storage device, a second path related to the task based on determining that the task has been executed successfully based on the second action, the second path comprising the second action.

Clause 4: The method of Clause 3, wherein storing the second path comprises: updating the first path by removing the first action from the first path and adding the second action to the first path to form an updated first path; and storing the updated first path as the second path.

Clause 5: The method of any one of Clauses 1-4, wherein sending the second instruction comprises sending the second instruction without calling the AI CUA model.

Clause 6: The method of any one of Clauses 1-5, further comprising: determining that the first path has been executed successfully, wherein at least one of (1) determining that the task has been executed successfully based on the first action, or (2) determining that the first path has been executed successfully comprises: obtaining, from the computer, a result of the task or of the first path, sending, to a client application, the result, and obtaining, from the client application, a feedback comprising an indication of a successful execution of the task or of a successful execution of the first path.

Clause 7: The method of Clause 6, wherein the client application comprises a user interface, and the feedback comprises a user feedback from a user.

Clause 8: The method of any one of Clauses 1-7, wherein: the task comprises a new task from a user, and the method further comprises: sending, to the AI CUA model, the new task; and obtaining, from the AI CUA model, the task.

Clause 9: The method of any one of Clauses 1-8, further comprising: generating a first vector representative of the first observation; storing, via a vector database, the first vector; sending, to the computer, a second observation request for a second observation; obtaining, from the computer, the second observation; generating a second vector representative of the second observation; and comparing the second vector with the first vector to determine a difference between the second vector and the first vector, wherein sending the second instruction to execute the first path on the computer comprises sending the second instruction based on comparing the second vector with the first vector.

Clause 10: The method of Clause 9, wherein sending the second instruction based on comparing the second vector with the first vector comprises: determining an anomaly score based on the difference between the second vector and the first vector; and sending the second instruction to execute the first path on the computer based on the anomaly score satisfying a threshold.

Clause 11: The method of Clause 9, wherein sending the second instruction based on comparing the second vector with the first vector comprises: determining an anomaly score based on the difference between the second vector and the first vector; based on the anomaly score not satisfying a threshold, sending, to a user interface, a request for approval to send the second instruction to execute the first path on the computer; obtaining a user approval to send the second instruction to execute the first path on the computer; and sending the second instruction to execute the first path on the computer based on the user approval.

Clause 12: The method of any one of Clauses 1-11, further comprising: obtaining, from the computer, an indication of an anomaly during the execution of the first path; performing, based on obtaining the indication of the anomaly during the execution of the first path, one or more of: sending, to the computer, an instruction to pause the execution of the first path; sending, to a user interface, an alert related to the anomaly; and sending, to the computer, an instruction to terminate the execution of the first path.

Clause 13: The method of any one of Clauses 1-12, wherein the first observation request comprises an indication of an initial action related to obtaining the first observation.

Clause 14: The method of any one of Clauses 1-13, wherein the computer is an instance of a virtual computer in data communication with the AI CUA.

Clause 15: The method of any one of Clauses 1-14, wherein the computer is a physical computer in data communication with the AI CUA.

Clause 16: The method of any one of Clauses 1-15, wherein the first instruction to execute the first action on the computer comprises an instruction to execute the first action on a web browser on the computer.

Clause 17: The method of any one of Clauses 1-16, wherein sending the second instruction to execute the first path on the computer comprises an instruction to execute the first path on a web browser on the computer.

Clause 18: A processing system, comprising: memory comprising computer-executable instructions; and one or more processors configured to execute the computer-executable instructions and cause the processing system to perform a method in accordance with any one of Clauses 1-17.

Clause 19: A processing system, comprising means for performing a method in accordance with any one of Clauses 1-17.

Clause 20: A non-transitory computer-readable medium storing program code for causing a processing system to perform the steps of any one of Clauses 1-17.

Clause 21: A computer program product embodied on a computer-readable storage medium comprising code for performing a method in accordance with any one of Clauses 1-17.

Clause 22: An apparatus, comprising a processing system that includes one or more processors and one or more memories coupled with the one or more processors, the processing system configured to: perform a method in accordance with any one of Clauses 1-17.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f)

unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method performed by an agent comprising an artificial intelligence (AI) system, including one or more processors, that autonomously controls a computer, the method comprising:

sending, to the computer, a first observation request to obtain a first observation related to a task to be performed on the computer, the first observation comprising first information related to one or more of a user interface (UI) or an environment of the computer;

obtaining, from the computer, the first observation;

sending, to an AI model, the first observation and a first action request to obtain a first action related to one or more steps for performing the task based on the first observation, the first action to be executed on the computer to complete at least one step of the one or more steps;

obtaining, from the AI model, the first action;

sending, to the computer, a first instruction to execute the first action on the computer;

determining that the task has been performed successfully based on an indication of successful performance of the task obtained from the computer after at least the first action has been executed on the computer;

based on determining that the task has been performed successfully after at least the first action has been executed on the computer, storing, via a data storage device, a first path related to the performing of the task, the first path comprising a sequence of actions for performing the task, the sequence of actions including at least the first action;

obtaining a task request to perform the task;

obtaining, from the data storage device, the first path;

determining an anomaly score based on a difference between a first vector representative of the first observation and a second vector representative of a second observation comprising second information related to the one or more of the UI or the environment of the computer;

based on the anomaly score not satisfying a threshold, sending, to another UI, a request for approval to send a second instruction to execute the first path on the computer;

obtaining a user approval to send the second instruction to execute the first path on the computer; and sending, to the computer and based on the user approval, the second instruction to execute the first path on the computer to perform the task based on the task request.

2. The method of claim 1, further comprising:

determining that a previous path has not been executed successfully, wherein the previous path is:

related to the performing of the task, comprises a second action related to the one or more steps, and stored via the data storage device prior to the first path being stored, wherein sending the first observation request is based on determining that the previous path has not been executed successfully.

3. The method of claim 1, further comprising:

determining that the first path has not been executed successfully;

sending, to the computer, a second observation request for the second observation;

obtaining, from the computer, the second observation;

sending, to the AI model, the second observation and a second action request to obtain a second action related to one or more other steps for performing the task;

obtaining, from the AI model, the second action;

sending, to the computer, a third instruction to execute the second action on the computer;

determining that the task has been performed successfully by executing at least the second action; and based on determining that the task has been performed successfully by executing at least the second action, storing, via the data storage device, a second path related to the task, the second path comprising another sequence of actions for performing the task, the other sequence of actions including at least the second action.

4. The method of claim 3, wherein storing the second path comprises:

updating the first path by removing the first action from the first path and adding the second action to the first path to form an updated first path; and storing the updated first path as the second path.

5. The method of claim 1, wherein sending the second instruction comprises sending the second instruction without calling the AI model.

6. The method of claim 1, further comprising:

determining that the first path has been executed successfully, wherein at least one of (1) determining that the task has been performed successfully after executing at least the first action, or (2) determining that the first path has been executed successfully comprises:

obtaining, from the computer, a result of one or more of the task or the first path, sending, to a client application, the result, and obtaining, from the client application, a feedback comprising an indication of one or more of a successful performance of the task or a successful execution of the first path.

7. The method of claim 6, wherein the client application comprises another UI, and the feedback comprises a user feedback from a user received via the other UI.

8. The method of claim 1, wherein:

the task comprises a new task from a user, and the method further comprises:

sending, to the AI model, the new task; and obtaining, from the AI model, the task.

9. The method of claim 1, further comprising:

generating the first vector;

storing, via a vector database, the first vector;

sending, to the computer, a second observation request to obtain the second observation;

obtaining, from the computer, the second observation;

generating the second vector; and comparing the second vector with the first vector to determine the difference between the second vector and the first vector, wherein sending the second instruction to execute the first path on the computer comprises sending the second instruction based on comparing the second vector with the first vector.

10. The method of claim 1, further comprising:

obtaining, from the computer, an indication of an anomaly during the execution of the first path; and based on obtaining the indication of the anomaly during the execution of the first path, performing one or more of:

sending, to the computer, an instruction to pause the execution of the first path;

sending, to the other UI, an alert related to the anomaly; or sending, to the computer, an instruction to terminate the execution of the first path.

11. The method of claim 1, wherein the first observation request comprises an indication of an initial action related to obtaining the first observation.

12. The method of claim 1, wherein the computer is an instance of a virtual computer in data communication with the agent.

13. The method of claim 1, wherein the computer is a physical computer in data communication with the agent.

14. The method of claim 1, wherein the first instruction to execute the first action on the computer comprises an instruction to execute the first action on a web browser on the computer.

15. The method of claim 1, wherein sending the second instruction to execute the first path on the computer comprises an instruction to execute the first path on a web browser on the computer.

16. A processing system, comprising: memory comprising computer-executable instructions; and one or more processors configured to execute the computer-executable instructions and cause the processing system to:

send, to a computer, a first observation request to obtain a first observation related to a task to be performed on the computer, the first observation comprising information related to one or more of a user interface (UI) or an environment of the computer;

obtain, from the computer, the first observation;

send, to an artificial intelligence (AI) model, the first observation and a first action request to obtain a first action related to one or more steps for performing the task based on the first observation, the first action to be executed on the computer to complete at least one step of the one or more steps;

obtain, from the AI model, the first action;

send, to the computer, a first instruction to execute the first action on the computer;

determine that the task has been performed successfully based on an indication of successful performance of the task obtained from the computer after at least the first action has been executed on the computer;

based on determination that the task has been performed successfully after at least the first action has been executed on the computer, store, via a data storage device, a first path related to the performance of the task, the first path comprising a sequence of actions for performing the task, the sequence of actions including at least the first action;

obtain a task request to perform the task;

obtain, from the data storage device, the first path;

determine an anomaly score based on a difference between a first vector representative of the first observation and a second vector representative of a second observation comprising second information related to the one or more of the UI or the environment of the computer;

based on the anomaly score not satisfying a threshold, send, to another UI, a request for approval to send a second instruction to execute the first path on the computer;

obtain a user approval to send the second instruction to execute the first path on the computer; and send, to the computer and based on the user approval, the second instruction to execute the first path on the computer to perform the task based on the task request.

17. The processing system of claim 16, wherein the one or more processors are further configured to cause the processing system to:

determine that a previous path has not been executed successfully, wherein the previous path is:

related to the performance of the task, comprises a second action related to the one or more steps, and stored via the data storage device prior to the first path being stored, wherein to cause the processing system to send the first observation request, the one or more processors are configured to cause the processing system to send the first observation request based on the determination that the previous path has not been executed successfully.

18. The processing system of claim 16, wherein to cause the processing system to send the second instruction, the one or more processors are configured to cause the processing system to send the second instruction without calling the AI model.

* * * * *